United States Patent
Koistinen

(10) Patent No.: US 7,257,114 B1
(45) Date of Patent: Aug. 14, 2007

(54) METHOD FOR TRANSMITTING CALLS OVER PACKET NETWORK

(75) Inventor: Tommi Koistinen, Espoo (FI)

(73) Assignee: Nokia Corporation, Espoo (FI)

( * ) Notice: Subject to any disclaimer, the term of this patent is extended or adjusted under 35 U.S.C. 154(b) by 1085 days.

(21) Appl. No.: 10/030,353

(22) PCT Filed: Jul. 6, 2000

(86) PCT No.: PCT/FI00/00622

§ 371 (c)(1),
(2), (4) Date: Feb. 20, 2002

(87) PCT Pub. No.: WO01/05166

PCT Pub. Date: Jan. 18, 2001

(30) Foreign Application Priority Data

Jul. 9, 1999 (FI) .................................... 991584

(51) Int. Cl.
H04L 12/66 (2006.01)
H04L 12/28 (2006.01)
H04J 3/16 (2006.01)
H04Q 7/20 (2006.01)

(52) U.S. Cl. .................. 370/356; 370/401; 370/466; 455/445

(58) Field of Classification Search ............ 370/328, 370/338, 352–356, 401, 389, 465–467; 455/445, 455/560
See application file for complete search history.

(56) References Cited

U.S. PATENT DOCUMENTS

| | | | | |
|---|---|---|---|---|
| 5,608,779 | A | 3/1997 | Lev et al. | 379/88 |
| 6,167,040 | A * | 12/2000 | Haeggstrom | 370/352 |
| 6,657,996 | B1 * | 12/2003 | Mladenovic et al. | 370/356 |
| 6,856,612 | B1 * | 2/2005 | Bjelland et al. | 370/338 |
| 2002/0049052 | A1 * | 4/2002 | Suvanen | 455/422 |

FOREIGN PATENT DOCUMENTS

| | | |
|---|---|---|
| WO | WO 99/05830 | 2/1999 |
| WO | WO 99/31911 | 6/1999 |
| WO | WO 00/33590 | 6/2000 |
| WO | WO 00/42789 | 7/2000 |
| WO | WO 00/54529 | 9/2000 |

* cited by examiner

Primary Examiner—Chau Nguyen
Assistant Examiner—Nittaya Juntima
(74) Attorney, Agent, or Firm—Squire, Sanders & Dempsey L.L.P.

(57) ABSTRACT

A transmitting/receiving arrangement, gateway and method for transmitting data over packet network, where a cellular network is connected to a packet network and uplink data frames which carry coded data and certain signaling information related to the coding are transmitted from the cellular network towards the packet network, wherein at least all non-redundant information from the uplink data frames is extracted from the frames and transmitted over the packet network. The gateway connects a packet network to a telephony network.

15 Claims, 5 Drawing Sheets

METHOD FOR TRANSMITTING CALLS OVER PACKET NETWORK

PRIORITY CLAIM

This is a national stage of PCT application No. PCT/FI00/00622, filed on Jul. 6, 2000. Priority is claimed on patent application No. 991584 filed in Finland on Jul. 9, 1999.

FIELD OF THE INVENTION

The invention relates in general to transmitting calls between cellular networks and packet networks. In particular the invention relates to supporting tandem free operation.

BACKGROUND OF THE INVENTION

In conventional PSTNs (Public Switched Telephony Network) the digitized speech is presented in a format that requires 64 kbps for transmission. In cellular networks efficient speech coding methods are used to compress the digitized speech before sending the speech over the radio access network. Decoding is used to obtain a data flow that is similar to the original digitized speech flow, for example, before transmitting the speech further to PSTN. The coding methods used in cellular networks compress the speech to a data flow that can be transmitted using less than 16 kbps in the fixed part of the cellular network. In the radio access network part of the cellular network also channel coding is needed, and the coded speech is also presented in a different format than in the fixed part of the cellular network.

If both the caller and callee use mobile stations then, in the absence of any precautions, the speech is coded and decoded twice, because it needs to be transmitted over a radio access network twice. This double coding may deteriorate the quality of the speech. It is possible to code the speech only once, if the coded speech is transmitted over the cellular networks and possible PSTN in between the cellular networks. This kind of operation is called tandem free operation (TFO).

FIG. 1 presents an example of the tandem free operation in a GSM (Global System for Mobile Communications) network. A one-way connection is presented in FIG. 1 for the sake of clarity. Usually connections are bidirectional, and the same functionality is performed in both directions. The mobile station MS1 101 communicates over a radio access network with a base station BS1 102. The digitized speech is coded in the mobile station, using codec C as presented in FIG. 1. Between a mobile station and a base station, the coded speech is presented in a format that is typical for the air interface. From the base station onwards, the coded speech is carried to a transcoder and rate adaptation unit (TRAU) in a certain format called TRAU frames. In FIG. 1 the base station BS1 transmits the coded speech to TRAU1 103. Base station controllers are not involved in the speech coding and are, therefore, not presented in FIG. 1.

The transcoder and rate adaptation unit usually decodes the speech and sends it further as a pulsed code modulation (PCM) signal that carries data with the rate of 64 kbps. The speech is sent to a Mobile Services Switching Center (MSC) which relays it either to another MSC or to the public telephony network. In FIG. 1 the TRAU1 decodes the coded speech (decodec D) and transmits the decoded speech to MSC1 104, and from there the speech is relayed via the PSTN 105 to another cellular network. The MSC2 106 relays the decoded speech further to TRAU2 107, where the speech is coded (codec C') and inserted to TRAU frames.

The base station BS2 108 converts the TRAU frames into a radio access network format, and transmits the data over the air interface to the mobile station MS2 109. In this mobile station the coded speech is decoded (decodec D').

The different arrows 110, 111 and 112 in FIG. 1 are used to present the data presentation format and signal carrying the data. Dashed arrows 110 refer to coded speech and the air interface. Solid arrows 111 refer to TRAU frames that require either an 8 kbps or a 16 kbps transmission channel and thick arrows 112 refer to decoded speech that requires a 64 kbps transmission channel and PCM signal.

If both mobile stations and TRAUs involved in a call have a common codec-decodec pair, it is possible to encode the speech only once. In the situation presented in FIG. 1, in tandem free operation the speech is coded in MS1 and decoded in MS2. TRAU1 relays the TRAU frames as TFO TRAU frames within the decoded speech (arrow 113 in FIG. 1). The TRAU1 performs also decoding and the decoded speech is transmitted to TRAU2, but it is used only if TRAU2 cannot extract the TFO TRAU frames from the data it receives. If TRAU2 notices the TFO TRAU frames, it relays the decoded speech carried by the TFO TRAU frames to BS2 in TRAU frames.

Tandem free operation requires thus special functionality, i.e. TFO capability, from the TRAUs. In practice the TFO capability means the following three things. First, the TRAUs can negotiate which codec is used. Second, they can transmit TFO TRAU frames to each other as part of the PCM signal and third, they can extract the TFO TRAU frames from the incoming PCM signal. In GSM the TFO TRAU frames are carried over the PCM so that the one or two least significant bits in each 8 bit long speech sample are replaced by TFO TRAU frame information. The TFO TRAU frame information is carried thus in a 8 kbps or 16 kbps subflow of the 64 kbps PCM flow. The destination TRAU can then ignore the rest of the PCM signal, and relay the TFO TRAU frames as TRAU frames towards the destination mobile station.

The transcoder and rate adaptation units involved in a call negotiate the speech codec using TFO inband signalling. This signalling is performed by modifying certain bits of the TRAU frame structure. The data carried in TRAU frames and TFO TRAU frames is essentially the same except for the TFO signalling bits. In the beginning of a call the TRAU units may each select the codec they use, but if both TRAUs support tandem free operation, a common codec may be negotiated. The decoded speech is usually also transmitted in the PCM signal even after a common codec has been agreed on. This is because after a handover, for example, both TRAUs involved in the call may not support the tandem free operation.

The current tandem free operation works between two cellular networks or if the cellular networks are connected via a PSTN. In the recent years, however, there has been an explosive growth in real-time data applications that use packet networks like the Internet as transport medium. These real-time applications can support voice calls and video calls. It is possible to use the Internet or other packet networks as transmission media between cellular networks, instead of PSTN. Especially with the third generation networks that are at least partly packet based, the use of packet networks between the cellular networks is a natural choice.

The H.323 specification has been created by the International Telecommunications Union (ITU) for the purpose of defining a standard framework for audio, video and data communications over networks that do not provide a guaranteed quality of service (QoS). Packet networks, for example, may be such networks. The aim of the H.323 specification is to allow multimedia products and applications from different manufacturers to interoperate.

FIG. 2 presents a situation where two GSM networks are connected with an IP (Internet Protocol) network. Each of the GSM networks 201, 202 is connected to the IP network 203 with an Voice over IP (VoIP) gateway. These VoIP gateways 204, 205 are connected to the MSCs 104, 106. From the cellular network they receive 64 kbps decoded speech as PCM signal (arrows 112 in FIG. 2), and they compress this data flow. The compressed data flow is then transferred over the IP network to another VoIP gateway (arrows 210 in FIG. 2). Usually the compressed data flow requires either 8 kbps or 16 kbps of transmission capacity. The H.323 specification, for example, defines certain codecs that can be used for compressing data in H.323 networks. It is also possible to construct proprietary codecs and gateways. Term gateway refers here neither to any specific packet network technology nor to any specific standards on telephony over packet networks. It is used as a general term for a network element connecting a cellular network and a packet network and relaying calls and other connections to and from the cellular network.

The problem in using compression in gateways when transmitting calls between cellular networks is that in the worst case the speech (or other data) is coded and decoded three times. First in the originating cellular network, then when transmitted between the cellular networks and finally in the destination cellular network. This may reduce the quality of the speech drastically.

A further problem is that even in a case, where both TRAU units involved in a call are TFO capable, it is possible that this feature cannot be utilized. This is because the TFO TRAU frames, which carry information about the speech codecs and TFO capabilities of the TRAUs and which are possible included in the PCM signal, do not necessarily stay unmodified in the compression and decompression in the gateways. Especially the TFO signaling, which is carried in certain bits of the TFO TRAU frame, is sensitive to change due to compression.

SUMMARY OF THE INVENTION

The object of the invention is to present a straightforward data transmission method that supports tandem free operation over packet networks. A further object is that the data flow to be transmitted over the packet network is smaller than the data flow coming from the cellular network. Even a further object is that the method for transmitting calls over packet networks is transparent to the cellular networks.

The objects of the invention are achieved by transmitting in the uplink direction over the packet network all non-redundant information from the frames that carry coded data.

A method according to the invention is a method for transmitting data over packet network, where a cellular network is connected to a packet network and uplink tandem free operation data frames, which carry coded data and in the frame structure inband tandem free operation signalling information related to the coding, are transmitted from the cellular network towards the packet network, and it is characterized in that at least all non-redundant information, said non-redundant information comprising said inband tandem free operation signalling information, from the uplink tandem free operation data frames is extracted from said frames in a gateway connecting the cellular network to the packet network and transmitted over the packet network.

A transmitting arrangement according to the invention is an arrangement for transmitting data over packet network, which comprises means for receiving data in telephony network format and
means for sending data in packet format, and it is characterized in that it further comprises means for separating tandem free operation frames, which carry coded data and inband tandem free operation signaling information related to the coding, from the received data, means for extracting data from said frames, said means arranged to extract at least said tandem free operation signalling information, and means for encapsulating the extracted data into packet protocol packets.

A receiving arrangement according to the invention is an arrangement for transmitting data over packet network, which comprises means for receiving data in packet format and
means for sending data in telephony network format, and it is characterized in that it further comprises means for extracting certain information from the received data, which information comprises coded data and tandem free operation signaling information related to the coding and means for processing the extracted information.

The means for processing the extracted information comprise either means for constructing decoded data from said coded data or ms for constructing tandem free operation frames, which carry said coded data and, as inband signalling, said tandem free operation signalling information.

The invention relates also to a gateway, which comprises
means for receiving and sending data in packet format and
means for receiving and sending data in telephony network format, and which is characterized in that it further comprises means for separating tandem free operation frames, which carry coded data and inband tandem free operation signalling information related to the coding, from the received telephony data, means for extracting data from said frames,
means for encapsulating the extracted data into packet protocol packets, means for extracting certain information from the received packet data, which information comprises coded data and tandem free operation signaling information related to the coding and means for processing the extracted information.

The means for processing the extracted information comprise either means for constructing decoded data from said coded data or means for constructing tandem free operation frames, which carry said coded data and, as inband signalling, said tandem free operation signalling information.

In a method according to the invention, a cellular network is connected to a packet network, for example with a gateway. Usually the gateways that connect telephony networks to packet networks compress the speech flow. In a method according to the invention, the uplink dataflow which comes from the cellular network comprises frames that carry coded speech. This happens, for example, when the coding-decoding unit that is involved in the connection in the cellular network operates in a tandem free manner.

In a method according to the invention, all non-redundant data from the received frames that carry coded data is transmitted over the packet network. Term non-redundant refers here to such data that cannot be inferred either from the other data within the frame or, for example, from a specification that defines the structure of the data frames.

The coded speech, for example, needs to be transmitted, as well as signalling which is related to the coding, for example to the tandem free operation. The frame structure may be transmitted as such or the information in the frames may be extracted and transmitted over various data connections.

In a method according to the invention, the data flow that is transmitted over the packet network is much smaller than the data flow which is sent from the cellular network. Therefore there is no need to compress the data flow further. And, although only part of the original data flow is transmitted over the packet network, the original data flow can be restored on the other edge of the packet network.

The uplink data flow may, for example, be monitored to detect the frames that carry coded data. It is easy to recognise and extract a certain frame structure from a data flow and to relay further the frames. If the information in the frames is to be transmitted further over various connections or if only the non-redundant part of the information in the frames is to be transmitted, then the entity performing the extraction of suitable information from the received frames has to understand the contents of the frame.

Term frame refers here to a data structure using a certain data presentation format. It does not refer, for example, to a certain signal that is used when transmitting the data structure. A TFO TRAU frame, for example, is thus a certain data structure, it does not refer to PCM signal over which the data structure is carried in cellular networks. Relaying frames refers to transmitting the received data structure using the same data presentation format. If, for example, the physical transmission media or some layer in the protocol stack is different on the receiving side and on the transmitting side, the actual signals used to carry the data structure may be different.

On the other edge of the packet network, there is an entity that recognises that the packet data flow (or flows) carry information about coded data frames. The entity may be a gateway, for example, and it may construct from the information it receives frames that are identical to those original frames that carried coded speech. This operation requires no information about the codecs. If the packet network is connected to a conventional telephony network and the connection terminates in a fixed phone, for example, the coded speech has to be decoded after it is transmitted over the packet network. The decoding can be done, for example, in a gateway where a decoding method corresponding to the coding method the mobile station used is supported. Information about the codec is often carried in the coded data frames, so there is no need for extra online signalling. A third option is, for example, that constructed frames are inserted to the decoded data flow. In this case, the data flow that is transmitted further from the packet network is similar to that data flow that entered the packet network. This last option supports any network or terminal that the original system without the packet network supports.

The main advantages of the invention are the following. First, the signalling that is related to the tandem free operation may be passed between the coding-decoding units in the cellular networks, e.g., the transcoder and rate adapting units in GSM networks. If data is compressed before transmitting it over the packet network, the data bits carrying the signalling information may be damaged. The signalling ensures that tandem free operation is fully extended to situations where the connection is transmitted over packet network at some point between the cellular networks. Second, it enhances the quality of the transmitted data. When the data that will be transmitted over the packet network is already coded, i.e. compressed, there is no need to compress it further and the coding-decoding functions in the gateways can be left out. This also saves some processing power compared to a situation where all received data is compressed.

A third advantage is that on the other edge of the packet network the second gateway, for example, may easily recognise that it receives frames that carry coded data or information about coded data. This can be done, for example, by sending the frame information over a specific connection. Thus there is no requirement for online signalling between the gateways or other network elements which are responsible for carrying out the method according to the invention. There is neither need for some configuration information stating that a certain gateway, for example, does not send compressed data but information about frames that carry coded data. If the cellular network that a certain gateway connects to the packet network comprises both tandem free operation capable and non-capable coding-decoding units, the gateway may send both compressed data and information about frames that carry coded data, depending on the coding-decoding unit that is involved in the call. Fourth advantage is that the networks, where a connection is originated and terminated, need not be aware that the connection is going through a packet network. On the other side of the packet data network, a similar data flow as that one that came towards the packet data network may be constructed. Further advantages are discussed in connection with the preferred embodiments.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention will now be described more in detail with reference to the preferred embodiments by the way of example and to the accompanying drawings where.

Above in conjunction with the description of the prior art reference was made to FIGS. 1 and 2. The same reference numerals are used for corresponding parts in the figures.

DETAILED DESCRIPTION OF THE PRESENTLY PREFERRED EMBODIMENTS

The GSM system, TRAU frames and TFO TRAU frames are here used as examples when describing the preferred embodiments of the invention. TFO TRAU frames are transmitted between the transcoder and rate adaptation units as part of the PCM signal. The TRAU frames may be any frames that carry coded data in a cellular network, and TFO TRAU frames any frames that carry coded data between coding-decoding units.

Figure 1:
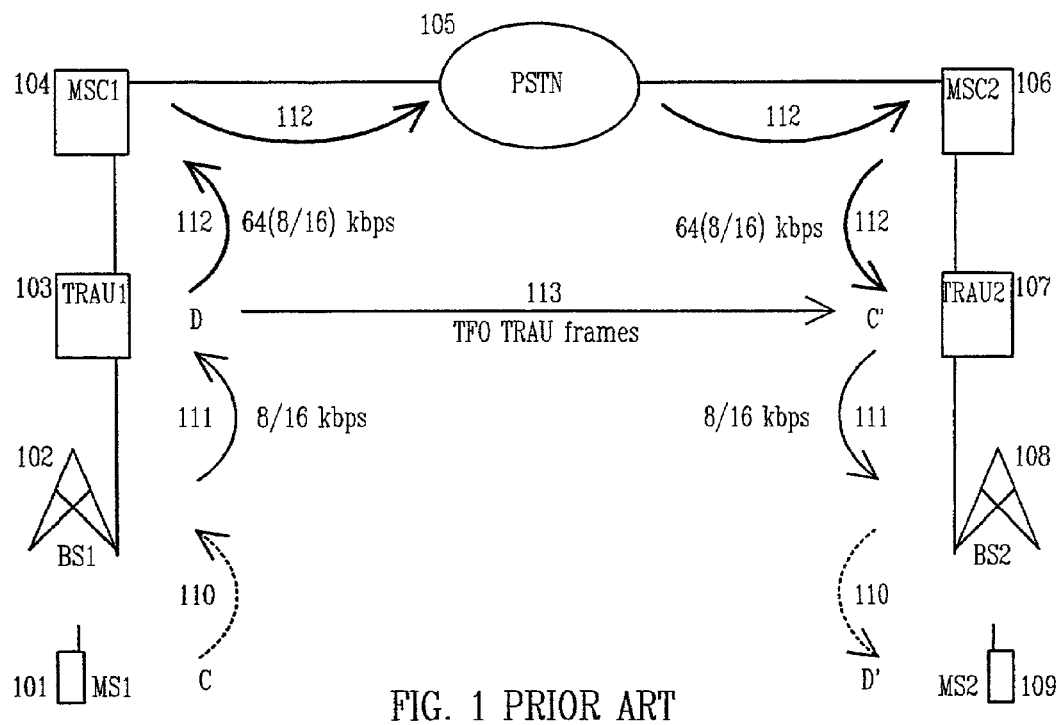
FIG. 1 shows a schematic drawing of a call between two mobile stations.
Figure 2:
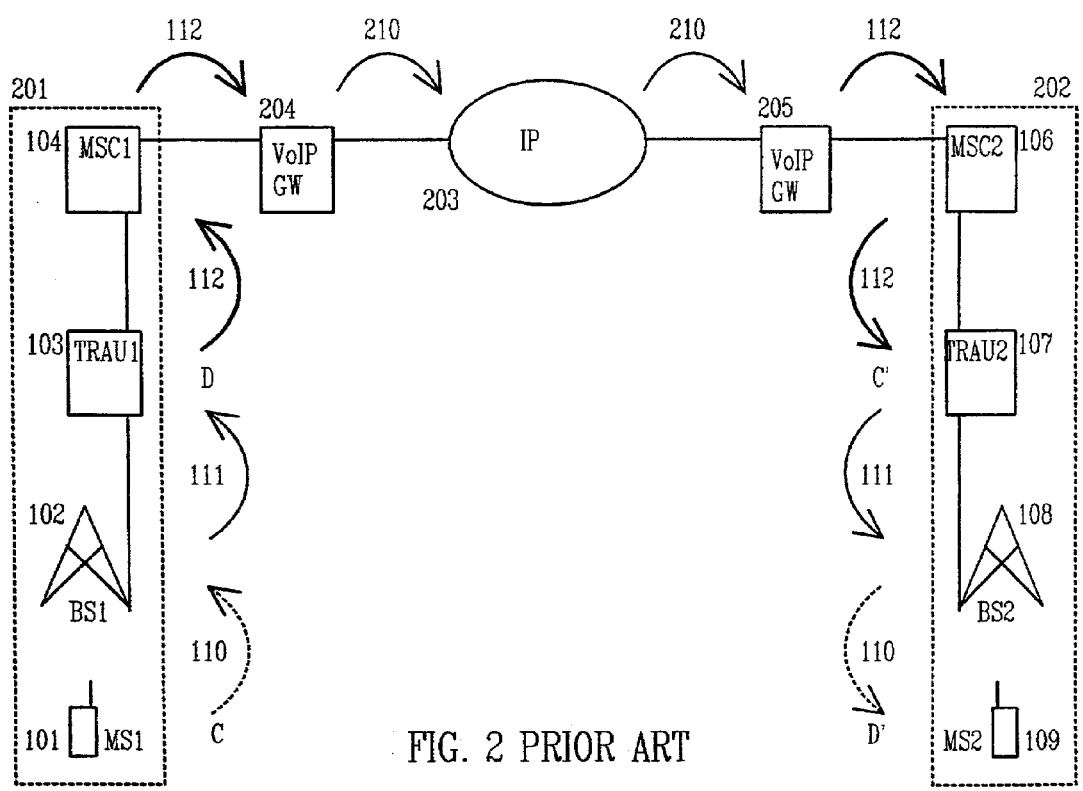
FIG. 2 shows a schematic drawing of a call between two mobile station that is passing a packet network.
Figure 3:
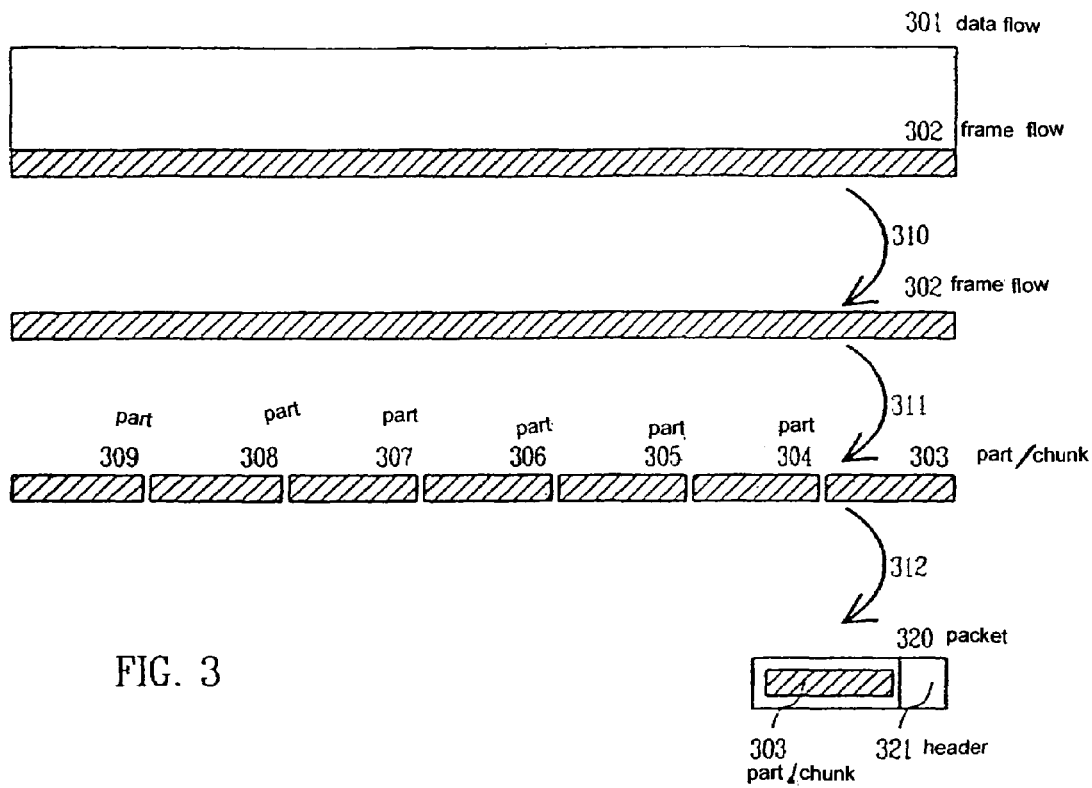
FIG. 3 shows a schematic drawing of a first preferred embodiment of the method according to the invention.

In a method according to a first preferred embodiment of the invention all information from the TFO TRAU frames is transmitted to the second gateway. FIG. 3 shows in the upper part the uplink data flow 301 that enters the first gateway in, for example, PCM form. Certain part of the data flow, usually the one or two least significant bits of each speech sample, is used to carry the TFO TRAU frames, and FIG. 3 presents this TFO TRAU frame flow 302. First, the TFO TRAU frame flow is separated from the rest of the PCM flow, which carries, for example, the decoded data. The separation is presented with arrow 310. If the TFO TRAU frame flow is, for example, a 8 kbps or 16 kbps subflow of the 64 kbps PCM flow, the separation can be carried out by selecting from every 8 bit long speech sample one or two least significant bits.

Next, the TFO TRAU frame flow is divided into parts that can be carried in the payload of a packet data protocol. FIG. 3 presents the division with arrow 311 and the resulting parts 303-309 are of equal size. The sizes may also vary and the size or sizes of the parts depend on the packet data protocol which is used to carry the data.

The data which consists of TFO TRAU frames is packetized, for example a header and a certain bit string to mark the end of the packet may be added. The details of the packetization depend on the protocol which is used. Arrow 312 presents the packetization. FIG. 3 shows as an example how part 303 of the TFO TRAU frame flow is packetised. A header 321 and other protocol-specific data is added to the data. The resulting packet 320 is then transmitted to the second gateway.

The separation of the TFO TRAU frame flow, the division of this flow into suitable data chunks and packetization of the data chunks is done in a continuous manner. To prevent excess delays due to waiting for a data chunk to be received and the separating and packetizing the data chunk, the size of the data chunk cannot be chosen too large.

Figure 4:
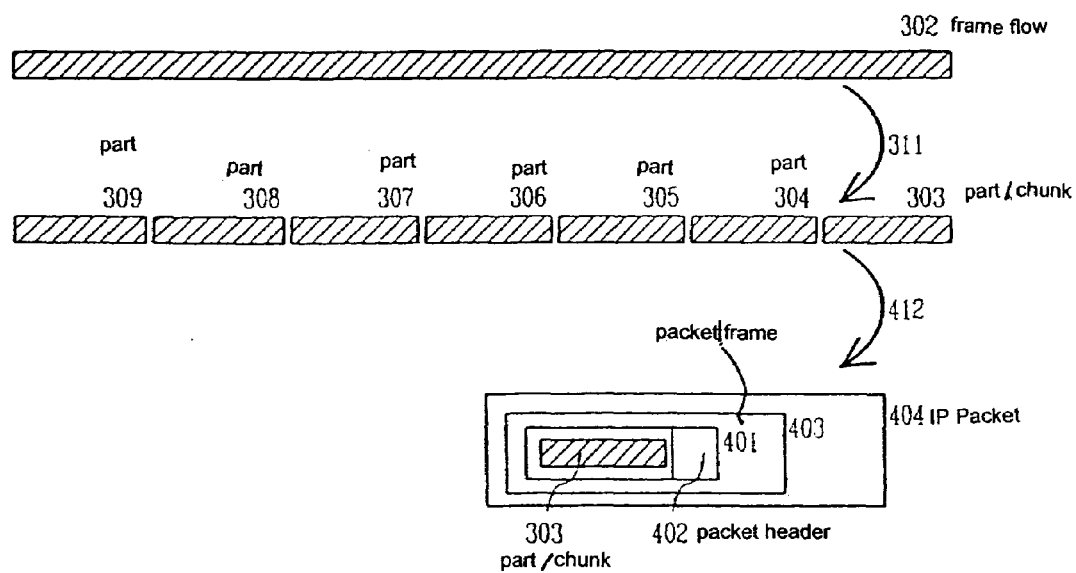
FIG. 4 shows a schematic drawing of a method according to a second preferred embodiment of the invention.

FIG. 4 presents a method according to a second preferred embodiment of the invention, where a protocol designed for carrying data for real-time applications is used to transmit the packets. The following protocol stack is used as an example. The TFO TRAU frames are packetised into Real-time Transport Protocol (RTP) packets. RTP is run over User Datagram Protocol (UDP) and UDP, in turn, over Internet Protocol.

This protocol stack is usually employed in IP telephony.

The information flow 302 consisting of TFO TRAU frames which has been separated from a PCM signal, for example, is presented in FIG. 4. This flow is divided (arrow 311) into parts 303-309, and these parts are placed (arrow 412) inside RTP packets. FIG. 4 shows as an example how the chunk 303 of the TFO TRAU frame flow is packetised to RTP packet 401. The RTP header (402) states, for example, the sequence number of each RTP packet related to this connection and some timing information. The RTP packet may comprise data related to many connection. The RTP packets are inserted to UDP packets 403, which in turn are to IP packets 404. The IP packets are then sent to the second gateway over the IP network.

In this method according to the second preferred embodiment of the invention, the TFO TRAU frame flow is divided into the RTP packets without paying attention to the framing. The RTP may thus comprise, for example, many TRAU frames or partial TRAU frames. The TRAU frames may have to be re-constructed on the other edge of the packet network.

Figure 5:
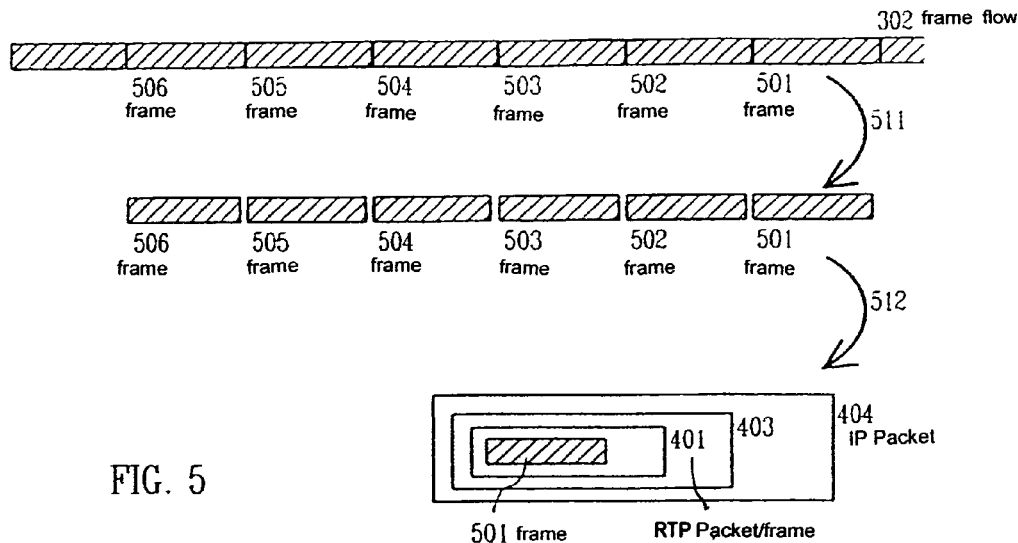
FIG. 5 shows a schematic drawing of a method according to a third preferred embodiment of the invention.

FIG. 5 presents a method according to a third preferred embodiment of the invention, where the TFO TRAU frame flow is divided into TRAU frames and each of these frames is inserted to a packet data protocol packet. The RTP/UPD/IP protocol stack is again used as an example.

FIG. 5 presents the information flow 302 consisting of TFO TRAU frames (whereof frames 501-508 are marked in FIG. 5). First the TFO TRAU frames 501-508 are extracted (arrow 511) from the information flow. Each TFO TRAU frame is inserted (arrow 512) to an RTP packet or to a RTP multiplexing unit. FIG. 5 shows the packetization of the TFO TRAU frame 501 to RTP/UPD/IP packet as an example. The RTP multiplexing refers to a situation where one RTP connection is used to carry data related to many calls. Between gateways it is advantageous to use RTP multiplexing, because multiple calls can be carried using only one RTP connection. The GSM TRAU frame, for example, is about 10 bytes long. If only one TFO TRAU frame is inserted to RTP/UDP/IP packet, the various protocol headers may consume up to 52 bytes. If there are multiple calls active in the same time, multiplexing reduces the overhead related to headers. Usually it is not possible to place many TFO TRAU frames related to a certain connection to one RTP packet, because this causes excess delay. Real-time applications are not tolerant to delays.

When whole TFO TRAU frames are relayed and each packet data protocol packet comprises one TFO TRAU frame, the advantage is that the second gateway does not have to figure out the frame structure separately.

It is also possible not to transfer certain synchronization bits of the TFO TRAU frames. These synchronization bits mark the beginning of a frame structure, and if information from one frame is transmitted in one packet of the packet protocol, the syncronization bits are not needed for that purpose. The second gateway, for example, may construct the TFO TRAU frames again and insert the well-known synchronization bit pattern to each frame if necessary. The saving in the trans-mission capability, when the synchronizing bits are not transmitted, may be up to 10%.

Figure 6:
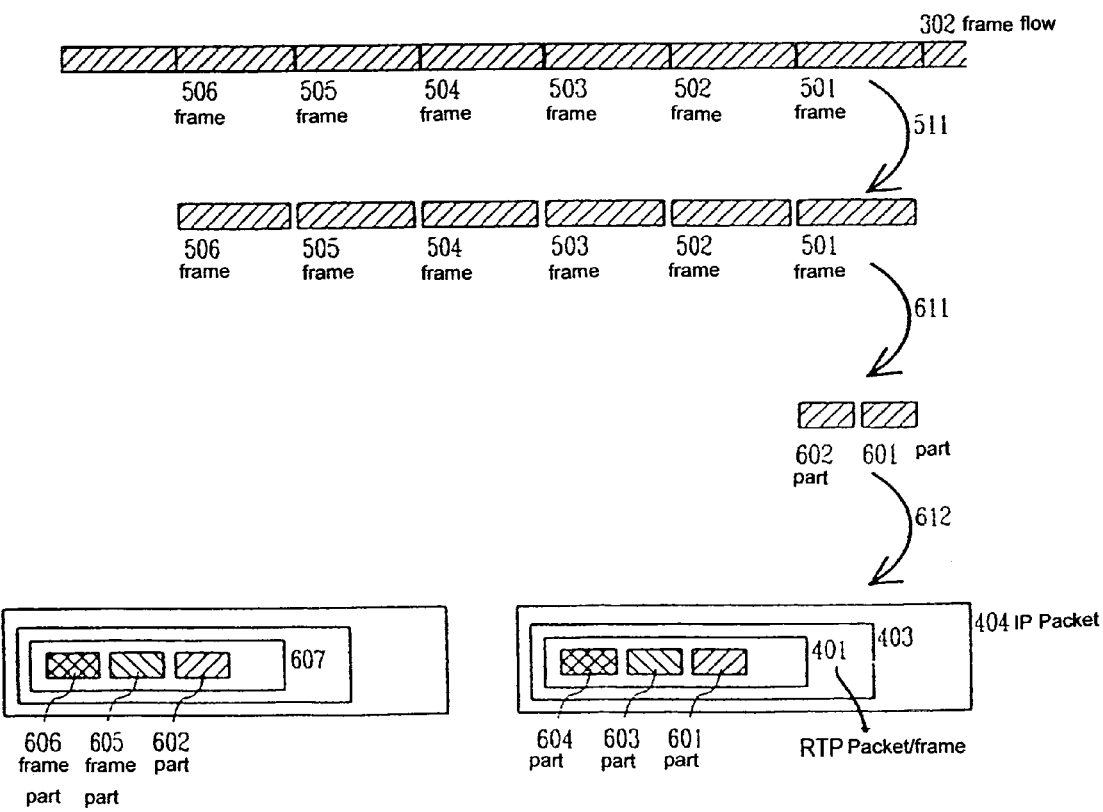
FIG. 6 shows a schematic drawing of a method according to a fourth preferred embodiment of the invention.

FIG. 6 presents a method according to a fourth preferred embodiment of the invention, where partial TFO TRAU frames are inserted to packet data protocol packets. The RTP/UPD/IP protocol stack is again used as an example. From the information flow 302 consisting of TFO TRAU, the TFO TRAU frames 501-506 are extracted (arrow 511). The TFO TRAU frames are divided into parts. FIG. 6 shows as an example that a TFO TRAU frame 501 is divided (arrow 611) to two parts 601 and 602. Each TFO TRAU frame part is inserted (arrow 612) to a RTP packet or to a RTP multiplexing unit, similarly as in the method according to the third preferred embodiment of the invention. FIG. 6 shows as an example the how the parts 601 and 602 of the TFO TRAU 501 are placed to RTP multiplexing units. RTP frame 401 comprises in addition to part 601 TFO TRAU frame parts 603, 604 relating to other two connections, and RTP frame 607 comprises in addition to part 602 TFO TRAU frame parts 605 and 606, which relate, for example, to same connections as parts 603 and 604. The TFO TRAU frame parts may be numbered so that the construction of frames is easier in the second gateway.

The packetizing of a TFO TRAU frame, TFO TRAU frame part or a data chunk in general into a protocol packet takes some time. The advantage of the method according to the fourth preferred embodiment of the invention is that if the TFO TRAU frames are divided before packetizing, the delay related to packetizing can be shortened. Due to the overhead of the packet headers, the transmission of partial TFO TRAU frames may be favourable only when RTP multiplexing is used.

Figure 7:
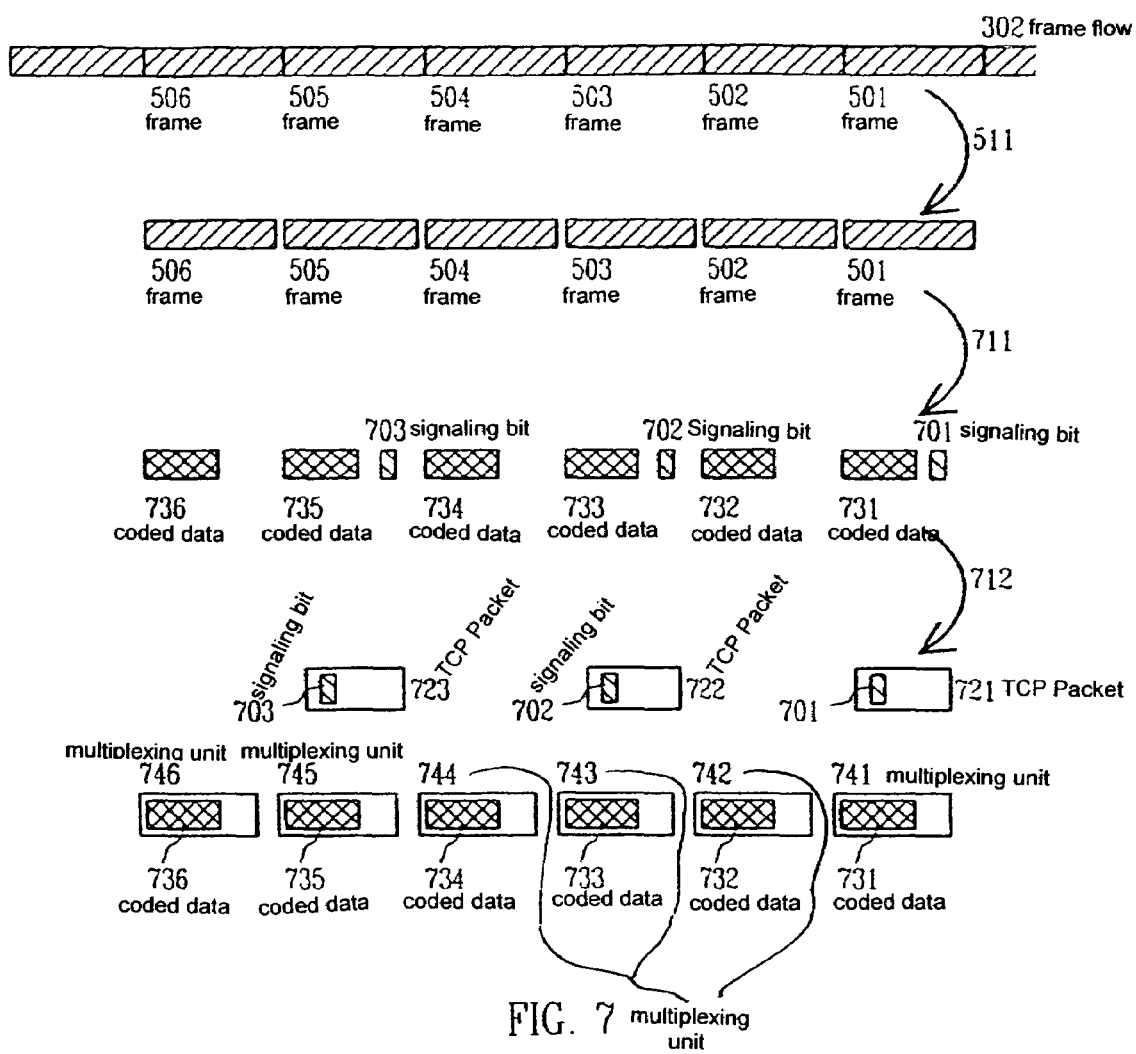
FIG. 7 shows a schematic drawing of a method according to a fifth preferred embodiment of the invention.

FIG. 7 presents a method according to a fifth preferred embodiment of the invention where only some information from the TFO TRAU frames is extracted and that information is transmitted over many connections. From the information flow 302 consisting of TFO TRAU frames, the TRAU frames 501-506 are extracted (arrow 511). Thereafter for example the TFO signalling bits 701-703 are extracted (arrow 711) from the frames. Because these signalling bits are important to the tandem free operation, they can be transmitted over a reliable connection. When using IP networks, Transport Control Protocol (TCP) can be used. In UDP there is no confirmation that the sent UDP packet are received in the other end of the connection, but TCP notices missing packets and sends them again. Another option is that the TFO signalling bits are transmitted using a RTP Control Protocol (RTCP) which typically runs over UDP. FIG. 7 shows the signalling data bits 701-703 being packetised to, for example, TCP packets 721-723 (arrow 712). Information related to, for example, the coder that has been used to code the data originally may also be extracted from the TFO TRAU frames and transmitted over the packet network.

The coded data 731-736 is also extracted (arrow 711) from the TRAU frames. This data can be transmitted, for example, over a RTP connection. FIG. 7 shows how each coded data chunk is inserted to one RTP packet or multiplexing unit 741-746 similarly as in the method according to the third preferred embodiment of the invention. It is also possible to divide the coded data in each frame into parts, and insert these parts into packet protocol packets.

It is possible to extract also other information from the TRAU frames, and transmit this information using yet another packet data connection. The whole PCM data flow can also be transmitted using, for example, the RTP. Transmission of the whole PCM flow may be necessary, for example, in a situation where the second gateway should decode the data carried by the TRAU frames, but does not support the required decoding method.

When using this method, the gateway or other entity that filters the information to be transmitted has to understand the contents of the TRAU frame, otherwise it cannot separate, for example, the signalling flow and the coded data flow. The advantages of this method according to the fifth preferred embodiment of the invention are that for each transmitted data flow it is possible to use a specific, suitable protocol. The data flows can be sent using different transmission media or transmission routes. If the PCM stream is transmitted, some operations such as echo canceling can be applied without disturbing, for example, the TFO signalling. Different error correction mechanisms may be applied in the different connections, and traffic analysis is also eased.

Figure 8:
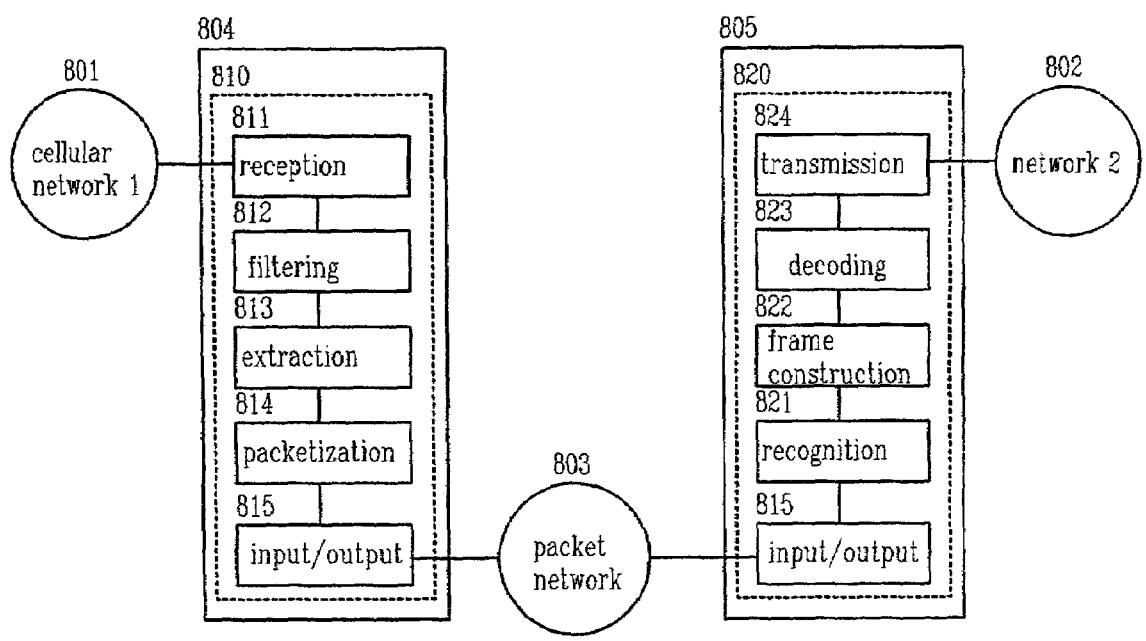
FIG. 8 shows schematic drawings of arrangements and a gateway according the invention.

FIG. 8 presents an arrangement where all non-redundant information from the TFO TRAU frames is transmitted over a packet network. A cellular networks 801 and another network 802 are connected with gateways 804 and 805 to a packet network 803. Consider a connection that goes from the cellular network 801 through the first gateway 804 to the packet network and from there through the second gateway 805 to the second network 802.

The transmitting arrangement 810 is responsible for receiving data in a format that is used in telephony networks and sending TFO TRAU frames or non-redundant information about the TFO TRAU frames to a packet network. In FIG. 8 this arrangement is implemented in the first gateway 804, but it may also be implemented using more than one network elements. The reception block 811 receives information in format that is used in telephony network, for example in PCM format. The filtering block 812 separates the possible TFO TRAU frame flow from the received signal. It may, for example, monitor the PCM signal, and recognise the starting pattern of TFO TRAU frames. Usually the TFO TRAU frames are carried using one or two of the least significant bits of each 8 bit long speech sample. The extraction block 813 extracts at least the non-redundant information from the TFO TRAU frames. The desired information from the TFO TRAU frames is inserted to packet data protocol packets, for example using a method according to one of the preferred embodiments of the invention. This is done in the packetizing block 814. The data packets are sent over the packet network using an input/output block 815. The blocks may be implemented, for example, using microprosessors and suitable programs. The input/output block and reception block may be, for example, standard network interface devices.

The receiving arrangement 820 is responsible for receiving packet data, constructing the TFO TRAU frames or decoded data and sending the constructed data further. In FIG. 8 the receiving arrangement 820 is implemented, by way of example, in the second gateway 805. The receiving arrangement 820 may comprise a similar input/output block 815 as the transmitting arrangement. In the recognition block 821 the received information is interpreted, for example, either as whole TFO TRAU frames or certain information from the TFO TRAU frames. In a construction block 822, where TFO TRAU frames (or information that is carried in TFO TRAU frames) are constructed from the information carried over the packet data connection(s). There may be a decoding block 823, where the coded data in the TRAU frames is decoded, resulting in a decoded data flow. The transmission block 824 is used to send data in a format that is used in telephony network.

The data that is sent from the receiving arrangement 820 may depend on the type of the network 802. If the network 802 is a cellular network where all coding-decoding units are TFO capable, the send data may comprise only the TRAU frames. At least in a case, where the TFO negotiation has been carried out and the data is coded and decoded only in the mobile stations, the decoded PCM data is not necessarily needed. The sent data may also comprise only the decoded data in PCM format. If, for example, the second network 802 is a PSTN and the connection is terminated to a conventional fixed phone, there is probably no need to transmit the TFO TRAU frames within the PCM signal. If both the TRAU frames are constructed and the coded data is decoded, the TRAU frames may be inserted as TFO TRAU frames to the decoded data flow. In this case the data flow, for example a PCM signal, is similar on both sides of the packet network.

In most cases the connections are bidirectional. This means that on both edges of the packet network there should be a transmitting arrangement 810 and a receiving arrangement 820. Both these arrangements may be implemented in one gateway, which is thus a combination of the gateways 804 and 805 presented in FIG. 8.

The GSM and IP networks have been used as examples of cellular network and packet network, respectively, when describing the details of the invention. The scope of the invention is not restricted only to there networks. For example, the invention may be applied in connection with Universal Mobile Communications System (UMTS).

Transcoder and rate adaptation unit (TRAU) of GSM network has been used as an example of a coding-decoding unit that is present in cellular networks.

TFO TRAU frames have been used as an example of a data structure that is used to carry information about coded data and details about the coding method between cellular networks. The coded data may be speech, video or any other data. The invention can be applied also with other data structures that carry corresponding information, irrespective of the name of the data structure.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method for transmitting data over packet network, the method comprising:
   connecting a cellular network to a packet network; and
   transmitting uplink tandem free operation data frames, which carry coded data and, in a frame structure, inband tandem free operation signalling information related to the coding, from the cellular network towards the packet network;
   wherein at least all non-redundant information, which comprises said inband tandem free operation signalling information, from the uplink tandem free operation data frames is extracted from said frames to the packet network and transmitted over the packet network, and the coded data from the uplink tandem free operation data frames is extracted and transmitted over a first packet data connection and the tandem free operation signalling information from the uplink tandem free operation data frames is extracted and transmitted over a second packet data connection.

2. The method of claim 1, wherein the uplink tandem free operation data frames are relayed.

3. The method of claim 2, wherein each uplink tandem free operation data frame is relayed in a packet of a certain packet protocol and that only one uplink data frame related to a certain connection is carried in each packet.

4. The method of claim 2, wherein the uplink tandem free operation data frames are divided into parts and each part is transmitted in a packet of a certain packet protocol and that only one part related to a certain connection is carried in each packet.

5. The method of claim 2, wherein the uplink tandem free operation data frames or parts of the uplink tandem free operation data frames related to more than one connection are carried in each packet.

6. The method of claim 1, wherein said tandem free operation signalling information is extracted and transmitted over a certain packet data connection that confirms delivery of packets.

7. The method of claim 6, wherein said tandem free operation signalling information is transmitted using Transport Control Protocol.

8. The method of claim 6, wherein said tandem free operation signalling information is transmitted using Real-time Transport (RTP) Control Protocol.

9. The method of claim 1, wherein non-redundant data from the uplink tandem free operation data frames is transmitted using a certain protocol that supports real time applications.

10. The method of claim 9, wherein the non-redundant data is transmitted using Real-time Transport (RTP) Control Protocol.

11. The method of claim 6, wherein the information transmitted over the packet network is processed on an edge of the packet network.

12. The method of claim 11, wherein the coded data, which is part of the non-redundant information transmitted over the packet network, is decoded on the edge of the packet network.

13. The method of claim 11, wherein downlink tandem free operation frames, which carry said coded data and, as inband signalling in the frame structure, said tandem free operation signalling information, are constructed on the edge of the packet network from the non-redundant information transmitted over the packet network.

14. The method of claim 11, wherein
   a second cellular network is connected to the packet network,
   second uplink tandem free operation data frames which carry coded data and inband tandem free operation signalling information related to the coding, are transmitted from the second cellular network towards the packet network,
   the uplink tandem free operation data frames and the second uplink tandem free operation data frames are related to a certain bidirectional connection,
   at least all non-redundant information, which comprises said inband tandem free operation signalling information, from the second tandem free operation uplink data frames is extracted from said second uplink tandem free operation data frames and transmitted over the packet network, and wherein
   all non-redundant information related to said connection and transmitted over the packet network is processed on edges of the packet network.

15. A gateway comprising:
   input block for receiving uplink tandem free operation data frames transmitted from a cellular network towards a packet network, said frames carrying coded data and, in a frame structure, inband tandem free operation signalling information related to the coding;
   extraction block for extracting at least all non-redundant information, which comprises said inband tandem free operation signalling information, from the received uplink tandem free operation data frames; and
   output block for transmitting the coded data extracted from the uplink tandem free operation data frames over a first packet data connection and said tandem free operation signalling information extracted from the uplink tandem free operation data frames over a second packet data connection.

* * * * *